3,167,343
ERECTION CLAMP
Raymond L. Renfroe, 1926 Spearing St., Jacksonville, Fla.
Filed Sept. 6, 1963, Ser. No. 307,415
12 Claims. (Cl. 294—67)

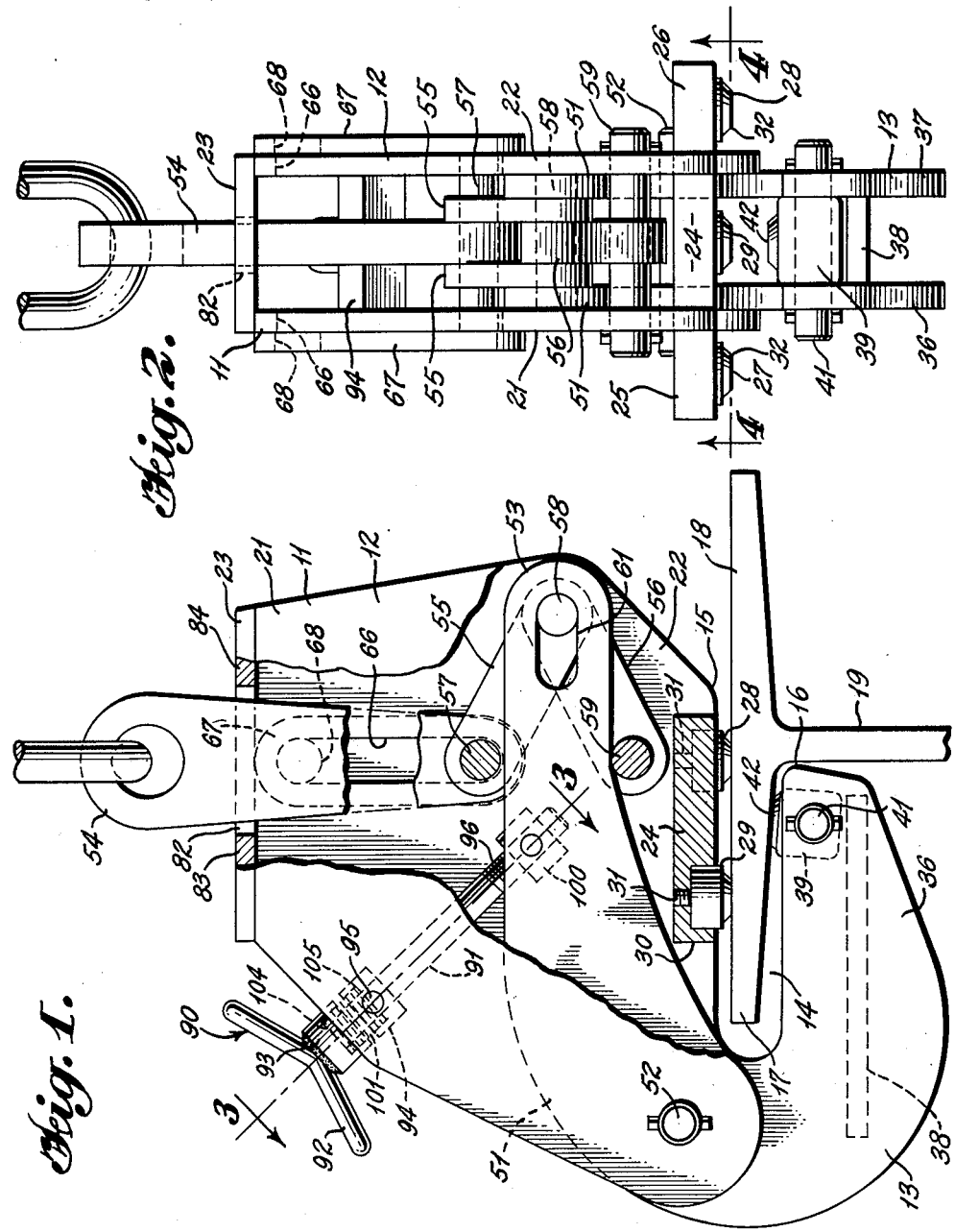

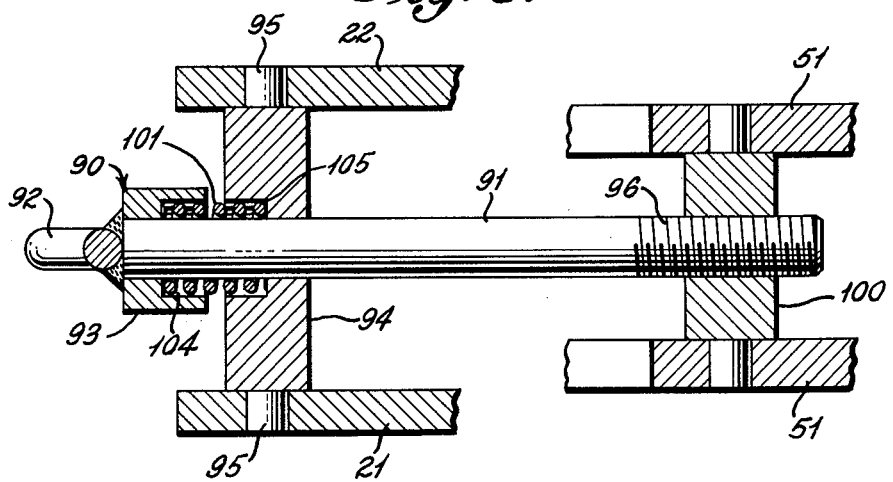
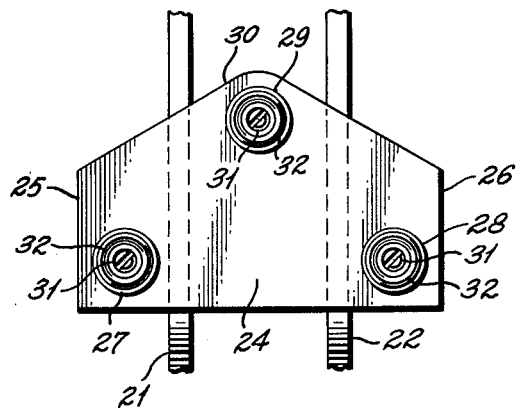

This invention relates to clamps for lifting structural articles and more particularly to clamps of such nature which include improved locking means for securing the clamp to the structural article. This in a continuation-in-part of my pending application Serial No. 205,657, filed June 27, 1962.

My previous application described a clamp which is particularly useful in lifting heavy structural articles such as wide flange beams, I beams and the like, for use in constructing the framework of buildings. The clamp as described in my earlier application also includes locking means to secure the clamp jaws in a gripping relation so that inadvertent release of the structural article being lifted will not occur. This invention is directed to an improvement in these locking means for securing the opposed jaws of a lifting clamp in a closed gripping position. While such improved locking means is particularly effective when employed in the specific clamp structure described in my earlier application, it is not limited to such structure and may be employed in a wide variety of clamps.

More particularly, the present invention encompasses improved locking means which provides an adjustable lock to positively prevent retraction of the opposed jaws from a gripping relation, and which includes resilient means to compensate for any slack created in the locking means caused for example by the gripping jaws biting into the article being lifted as a lifting force is applied to the clamp.

This invention allows the gripping jaws to be positively or directly locked in a gripping relation by an easily-performed manual manipulation of the locking device, and provides a substantial improvement over prior clamp locks, which rely solely upon the strength of a spring for a locking mechanism.

The resilient means included in this new locking device supplements the positive immovable metal-to-metal lock by taking up any slack in the metal-to-metal lock created by the gripping jaws biting more deeply into the structural article as the lifting force is applied to the clamp. This positive lock, combined with the resilient means to take up any slack, secures the clamp jaws to the structural article with such strength that it would be practically impossible to inadvertently release the article that is being lifted.

It is, therefore, an object of this invention to provide a lifting clamp with improved locking means of the character described to positively secure the clamp jaws in a gripping position upon the structural article.

Another object of this invention is to provide a lifting clamp with an improved locking means which positively secures the jaws in a gripping relation and which includes resilient means to compensate for any slack in the locking device created for example when the gripping jaws of the clamp bite into the structural article as a lifting force is applied to the clamp.

A still further object of this invention is to provide locking means for a lifting clamp which is easy to operate by manual manipulation, and which is simple in construction, so that cost of construction and maintenance thereof is substantially reduced.

The invention generally relates to a lifting clamp comprising a clamp for lifting structural articles which comprises a clamp body including a pair of opposed jaws defining a slot between the jaws to receive the structural article to be lifted, one of said jaws being movable with respect to the other jaw, linkage means connected to said clamp body to bring said jaws inwardly toward an initial gripping relation relative to the article as a lifting force is applied to the clamp, said linkage means including a shackle to which said lifting force may be applied, adjustable lock means to positively prevent the retraction of said jaws outwardly away from said initial gripping relation, and resilient means biasing said jaws inwardly beyond said initial gripping relation to compensate for any slack in said adjustable lock means resulting from any further inward movement of said jaws.

This invention having been generally described, a specific embodiment will now be discussed in detail with reference to the accompanying drawings in which:

FIGURE 1 is an elevation view of one embodiment of a clamp including the present invention shown with the jaws in position to be locked upon one edge of the structural member to be lifted.

FIGURE 2 is an end view of the clamp as shown in FIGURE 1 removed from the structural member.

FIGURE 3 is a section view taken along line 3—3 in FIGURE 1 and shows the improved locking device in detail.

FIGURE 4 is a sectional view taken along line 4—4 in FIGURE 2 and shows the preferred placement of the ridged gripping surfaces included in the upper jaw.

Shown in FIGURE 1 is a clamp structure which includes a body 11 having an upper body portion 12 and a lower body portion 13. The body 11 defines between the upper and lower portions 12 and 13 a horizontal slot 14 open along one edge between open lips 15 and 16 to receive laterally into the slot one side of a horizontal flange 17 of a conventional wide flange beam 18. Beam 18 has the usual vertical web 19 centrally disposed below the flange and perpendicular thereto. The slot 14 extends completely through the body 11 in a direction longitudinal of the beam 18 to be lifted. The slot should be sufficiently deep to enable the lip 16 to extend to the web of a variety of beams which can be lifted by the clamp.

The upper body portion 12 includes a pair of spaced side plates 21 and 22, an upper plate 23 and a lower cross piece 24. The cross piece 24 protrudes from both sides of the upper body portion 12 and inwardly into the slot to form wings 25, 26 and 30. Gripping jaws 27, 28 and 29 are respectively mounted in the lower face of each of these wings. Each of these gripping jaws 27, 28 and 29 is connected to its respective wing by a threaded fastener 31 which permits the jaw to swivel about its own axis but precludes movement of such jaw along such axis. The surface of each of these gripping jaws is characterized by protruding sharp annular ridges 32 (FIGURE 4) which bite into the surface of the flange of the beam or other structural member being lifted.

The lower body portion 13 includes a pair of spaced side plates 36 and 37 connected by a bottom cross piece 38. Pivotally connected between the spaced plates 36 and 37 is a lower jaw 39. A pivot pin 41 extends through the jaw 39 and the side plates 36 and 37 in a direction longitudinally of the article to be lifted and across the slot 14. The jaw 39 is also characterized by sharp annular ridges 42 which bite into the underside of the flange 17. As best illustrated in FIGURE 1, the lower jaw 39 may be pivoted about the pin 41 to raise the back edge of the jaw (i.e., the edge furthest from the open lips 15 and 16) to permit the ridged gripping surface to conform to the usual outward taper of the underside of the flange 17 of a conventional wide flange beam or I beam. It will be understood that the clamp may lift a wide variety of structural members including, without limitation, wide flange beams, I beams, H beams, T beams, channels, angles and the like.

Integral with the lower body portion 13 is a connecting arm 51 which extends laterally around the slot 14 opposite the open edge of the slot and between the plates 21 and 22 of the upper body portion 12. The connecting arm 51 comprises a pair of spaced plates and is pivotally connected to the upper body portion by a pivot pin 52. Thus the raising and lowering of the outer end 53 of the upper portion of the connecting arm 51 results in closing and opening of the jaw 39 respectively. A shackle 54 is connected to the upper body portion 12 and to the connecting arm 51 to apply a substantial closing force to the jaws when a vertical lifting force is applied to the shackle, and to retain such closing force when the beam 18 is lifted by the lifting force. Specifically, toggle links 55 and 56 are connected between the shackle 54 and the upper body portion 12. As shown in FIGURE 2, the link 55 comprises a double strap and the link 56 is a single strap. The lower end of the shackle is pivotally connected to the upper end of the link 55 by a pivot pin 57. The lower end of the link 55 is pivotally connected by a pivot pin 58 to the upper end of the link 56. In turn, the lower end of the link 56 is connected by a pivot pin 59 which extends between the plates 21 and 22 of the upper body portion 12. The pin 59 is fixed against movement transverse to its axis relative to the upper body portion 12. The pivot pin 58 is also connected to the outer end 53 of the connecting arm 51 by extending through an elongated slot 61 in such outer end of the connecting arm. Thus, when a lifting force is applied to the shackle 54, the pin 57 moves upwardly and the pin 58 moves upwardly and inwardly. The latter slides along the slot 61 and imparts an upward movement to the connecting arm 51, thereby applying a substantial closing force to the jaws. The closing force is applied upwardly to the jaw 39 through the connecting arm 51 and downwardly to the jaws 27, 28 and 29 through the pin 59 and the upper body portion 12. Preferably, the length and arrangement of the individual members making up the linkage means between the lifting cable and the jaws is such that a lifting force on the shackle is multiplied into a greater gripping force on the jaws. Such linkage means includes the shackle 54, the toggle links 55 and 56, the connecting arm 51, the lower body portion 13 and their respective connecting pivots. It can be seen that the length of the effective lever arm of the connecting arm 51 between the pin 52 and the pin 58 is increased by extending the end of the arm 51 past the pins 57 and 59, with the toggle links 55 and 56 extending to the front rather than to the rear of the clamp. Thus, the pins 52 and 58 are located on opposite sides of the line between pins 57 and 59.

An elongated vertical slot 66 extends into the inside face of each of the plates 21 and 22 to provide a vertical guide for the shackle pin 57. Desirably, a reinforcing pad 67 is attached to the exterior surface of each of the plates 21 and 22 to cover the slot 66. An opening 68 extends through each of these reinforcing pads 67 in alignment with the upper end of the slot 66. In normal use, however, when the shackle is in its uppermost position the shackle pin 57 remains below the opening 68. When the pins 52 and 59 are removed, however, the shackle pin 57 may be lifted into alignment with the opening 68 and removed.

The top plate 23 of the upper body portion 12 is provided with an elongated slot 82 which extends in a direction parallel to the plane of the body 12 and perpendicular to the plane of the web of the beam being lifted. The shackle 54 is freely pivotable about its mounting pin 57 for movement along the slot 82. The ends 83 and 84 of the top plate beyond the ends of the slot 82 provides stops to limit the travel of the shackle along this slot.

The improved locking means in accordance with this invention, which may lock the clamp in a closed gripping relation, is shown in FIGURE 1 and FIGURE 3. As previously described, lower jaw 39 and its connecting arm 51 are pivotally connected to the clamp body through pivot pin 52. This improved clamp locking means, generally designated by numeral 90, operates to lock the clamp jaws by a positive, direct metal-to-metal connection between pivoted jaw 39 and the clamp body 11. In the embodiment shown in the drawings, this positive connection is accomplished by threadably connecting the locking means 90 with connecting arm 51.

Locking means 90 comprises a threaded rod 91 having at its outer end a wing handle 92 so that the lock can be manually operated. The outer end of rod 91 also includes a shoulder 93 providing a first abutment means. A second abutment means is provided by a cross member 94 fixed to the clamp body 11 between the side plates 21 and 22. The member 94 is preferably pivotally mounted on clamp body 11, such as by pins 95. Rod 91 extends through the member 94 and its inner end is threadably connected to the connecting arm 51 by means of threads 96, which cooperate with the opposing threads on a cross member 100, the latter member being secured to connecting arm 51. Member 100 is preferably pivotally mounted on connecting arm 51. Thus, the members 94 and 100 are free to rotate as the arm 51 pivots about the pin 52. The first and second abutment means are in substantial alignment along the longitudinal axis of the rod 91.

A helical spring 101 is placed between the first abutment 93 and the second abutment on member 94 so that the spring is compressed by the movement of the first abutment toward the second abutment as the lock is manually rotated into a locked position. Preferably, the first and second abutments include opposed recesses 104 and 105 respectively, which retain the spring 101 therebetween. These opposed recesses enclose the spring 101 when the abutment 93 engages the abutment on member 94. Thus assembled, locking means 90 will release the clamp jaws for movement toward an open relation when handle 92 is rotated counterclockwise. When the jaws are brought into engagement with the flange 17 of the beam to be lifted and the handle 92 is rotated in the opposite clockwise direction, the locking means 90 will compress the spring 101 and apply a closing force to the jaws. When the spring is fully compressed and the abutment 93 engages the abutment on member 94 in metal-to-metal contact the locking means positively prevents retraction of the jaws, the abutment 93 acting as stop means to prevent the rod 91 from sliding relative to member 94.

In operation, the clamp with locking means 90 in an unlocked position may be mounted on the flange 17 of a beam 18 when the flange is horizontal and the web of the beam is vertical, as shown in FIGURE 1. The edge of the beam flange is inserted into the slot 14 and the clamp is moved toward the beam as far as possible until the lip 16 is against or close to the web 19, as also shown in FIGURE 1. The lock handle 92 is then rotated clockwise so that the rod 91 is moved inwardly by the action of the threads 96 co-operating with member 100. This rotation of rod 91 moves first abutment 93 downward and compresses spring 101. Continued rotation of the rod draws connecting arm 51 upwardly inside the clamp body between side plates 21 and 22. The movement of arm 51 draws lower jaw 39 upwardly against the lower portion of the flange 17. The rotation of handle 92 is continued until the flange 17 is gripped between the clamp jaws and first abutment 93 contacts the second abutment on members 94, thereby fully compressing spring 101 therebetween. When handle 92 completely resists manual rotation the clamp is positively locked on the beam flange. The metal-to-metal contact between the first and second abutment positively retains the jaws against retraction from their initial gripping relation with the flange.

With the clamp locked to the beam in such a manner, a vertical lifting force is now applied to the shackle 54. This lifting force is transmitted to connecting arm 51 and the lower jaw 39 through the pin 58, as previously described, and creates a far greater closing force on the clamp jaws than that caused by the operation of locking means 90. This increased closing force frequently causes the ridged gripping surfaces of the jaws, 27, 28, 29 and 42 to bite into flange 17. As the opposed jaws are brought into a closer gripping relation by this biting, lower jaw 39 and its connecting arm 51 move upwardly, also urging rod 91 upwardly through member 94. This movement of rod 91 creates slack in the locking means 90 which was not present before this lifting force was applied to the clamp.

In order that such slack does not cause the release of the beam from the clamp as a lifting force is applied to the shackle, this invention compensates for this slack by the operation of spring 101. As seen in FIGURES 1 and 3, spring 101, being under compression, forces the first abutment 93 away from the second abutment on member 94, urging rod 91 and connecting arm 51 upwardly. The lower jaw 39 is thus continuously biased in a gripping relation by the force of spring 101 to compensate for the slack present in lock 90 as the jaws bite into the beam being lifted. When there is any tendency of the beam to pull out of the clamp jaws, the lock provides the combination of a resilient lock until any slack between the abutment 93 and the abutment on member 94 is taken up, and then a positive metal-to-metal lock thereafter.

With the clamp so locked on the beam, the beam is lifted to its final position in the structure being constructed where attaching means, such as bolts or rivets, are emplaced to retain it in such position. An operator can then walk out onto the beam and, by rotating locking handle 92 in a counterclockwise direction, release the clamp from the beam. The clamp can then be removed from the beam, and easily placed upon another beam to be lifted.

The drawings and the above description illustrate what is considered to be a preferred embodiment of the invention. It will be understood, however, that various modifications may be made by persons skilled in the art without departing from the scope of the invention, which is defined solely by the appended claims.

What is claimed is:

1. A clamp for lifting structural articles which comprises a clamp body including a pair of opposed jaws defining a slot between the jaws to receive the structural article to be lifted, one of said jaws being movable with respect to the other jaw, linkage means connected to said clamp body to bring said jaws inwardly toward an initial gripping relation relative to the article as a lifting force is applied to the clamp, said linkage means including a shackle to which said lifting force may be applied, adjustable lock means to positively prevent the retraction of said jaws outwardly away from said initial gripping relation, and resilient means biasing said jaws inwardly beyond said inital gripping relation to compensate for any slack in said adjustable lock means resulting from any further inward movement of said jaws.

2. A clamp according to claim 1 wherein said adjustable lock means comprises a pair of abutments normally spaced apart by said resilient means and means to move said abutments together into mutual engagement to compress said resilient means and to positively prevent said retraction.

3. A clamp according to claim 1 wherein said adjustable lock means comprises a member attached to said clamp body, a member attached to said linkage means, a locking rod extending through said members, said rod threadably connected to one of said members and freely slidable relative to the other member, said rod having a handle to permit manual rotation of said rod, and stop means affixed to said rod and movable axially therewith into engagement with said other member as said handle is rotated to move said rod in a locking direction so that further rotation of said handle applies a positive locking force to said movable jaw.

4. A clamp according to claim 3 wherein said resilient means comprises a helical spring mounted upon said rod between said stop means and said other member so that said spring is compressed as aid rod is rotated in said locking direction.

5. A clamp according to claim 4 wherein said stop means and said other member define opposed faces which are brought into abutting relation by rotation of said rod in said locking direction, at least one of said faces defining a recess to enclose said spring when said faces are in said abutting relation.

6. A clamp according to claim 3 wherein said members are pivotally connected to said clamp body and to said linkage means respectively.

7. A clamp according to claim 6 wherein said other member is connetced to said clamp body, said one member is connected to said linkage means and said stop means is positioned outwardly of said other member.

8. A clamp for lifting structural articles comprising a clamp body defining a slot to receive a structural article to be lifted, opposed jaws located on opposite sides of said slot, one of said jaws being movable with respect to the other jaw, linkage means connected to said clamp body to bring said jaws inwardly toward an initial gripping relation relative to the article as a lifting force is applied to the clamp, said linkage means including a shackle to which said lifting force may be applied, lock means including a pair of normally spaced abutments, said lock means being adjustable to bring said abutments into mutual engagement to positively prevent the retraction of said jaws outwardly from said initial gripping relation, and resilient means biasing said abutments apart and said jaws inwardly beyond said initial gripping relation to compensate for any slack between said abutments resulting from any further movement of said jaws.

9. A clamp according to claim 3 wherein said jaws include ridged gripping surfaces which bite into the structural article as a lifting force is applied to the clamp.

10. A clamp for lifting structural articles which comprises a clamp body defining a horizontal slot to receive an article to be lifted, said body including an upper body portion defining an upper jaw above said slot and a lower body portion defining an opposed lower jaw below said slot, one of said jaws being movable with respect to the other jaw, linkage means connected to said upper body portion to bring said jaws inwardly toward a gripping relation as a lifting force is applied to the clamp and to retain said jaws in said gripping relation when said structural article is raised by said lifting force, said linkage means including a shackle movably mounted in said upper body portion to which said lifting force may be applied and also including a connecting arm extending laterally around said slot opposite to the open end of said slot, said connecting arm being pivotally connected to said upper body portion, adjustable lock means comprising a member attached to said upper body portion, a member attached to said linkage means, a locking rod extending through said members, said rod threadably connected to one of said members and freely slidable relative to the other member, said rod having a handle to permit manual rotation of said rod, stop means affixed to said rod and movable axially therewith into engagement with said other member as said handle is rotated to move said rod in a locking direction so that further rotation of said handle applies a positive locking force to said movable jaw, and a helical spring mounted upon said rod between said stop means and said other member so that said spring is compressed as said rod is rotated in said locking direction to compensate for any slack created in said adjustable lock means.

11. A clamp according to claim 10 wherein said other member is pivotally connected to said upper body portion, said one member is pivotally connected to said connecting arm and said stop means is positioned outwardly of said other member.

12. A clamp according to claim 10 wherein said jaws include ridged gripping surfaces which bite into said structural article as a lifting force is applied to said clamp.

References Cited in the file of this patent
UNITED STATES PATENTS

| | | |
|---|---|---|
| 2,654,630 | Renfroe | Oct. 6, 1953 |
| 2,676,838 | Gardner | Apr. 27, 1954 |